United States Patent [19]

Büchbjerg et al.

[11] Patent Number: 4,677,065

[45] Date of Patent: Jun. 30, 1987

[54] PRODUCTION OF IMPROVED PROTEIN ISOLATE DERIVED FROM SEEDS OF A GRAIN LEGUME

[75] Inventors: Ernst Büchbjerg, Videbaek; Rud F. Madsen, Nakskov, both of Denmark

[73] Assignee: Aktieselskabet De Danske Sukkerfabrikker, Copenhagen, Denmark

[21] Appl. No.: 842,814

[22] Filed: Mar. 24, 1986

[51] Int. Cl.$^4$ ................................................. A23J 1/14
[52] U.S. Cl. ........................................ 435/68; 435/69; 530/370; 530/372; 530/378; 530/407
[58] Field of Search ............... 530/378, 407, 370, 372; 435/68, 69

[56] References Cited

U.S. PATENT DOCUMENTS

| | | | |
|---|---|---|---|
| 2,217,264 | 10/1940 | Weizmann | 530/407 X |
| 3,127,388 | 3/1964 | Johnson et al. | 530/378 |
| 3,682,646 | 8/1972 | De Paolis | 530/378 X |
| 4,282,319 | 8/1981 | Conrad | 435/69 |
| 4,324,805 | 4/1982 | Olsen | 435/69 X |
| 4,370,267 | 1/1983 | Lehnhardt et al. | 530/378 |

OTHER PUBLICATIONS

Bhatty, *Can Inst. Food Sci. Technol. J.*, vol. 15, No. 2, 101–108 (1982).

Bhatty et al, *J-Agric. Food Chem.*, vol. 31, 297–300 (1983).

*Primary Examiner*—Howard E. Schain
*Attorney, Agent, or Firm*—Burns, Doane, Swecker & Mathis

[57] ABSTRACT

Seeds of a grain legume of relatively low lipid content are processed under conditions found to yield an improved protein isolate which is well suited for human consumption. The seeds of the grain legume are wet-milled in an aqueous medium to form a finely milled slurry with the protein being substantially dissolved in water (as described). Solid material is removed from the protein slurry, and low molecular weight coagulation inhibitors inherently present are removed from the extract of protein by ultrafiltration with the aid of diafiltration to form a protein retentate. The protein retentate is coagulated through the action of proteolytic enzyme (as described) to produce the improved protein isolate of the present invention which optionally may be recovered in a particulate solid form. The resulting protein isolate of the present invention exhibits excellent emulsifying properties and can be used to advantage as an additive for food systems. For instance, the improved protein isolate is well compatible with meat products, such as sausages, etc. In a preferred embodiment the seeds are from *Pisum sativium* plants (i.e., they are field peas).

42 Claims, No Drawings

PRODUCTION OF IMPROVED PROTEIN ISOLATE DERIVED FROM SEEDS OF A GRAIN LEGUME

BACKGROUND OF THE INVENTION

Heretofore, there has been a need to provide improved techniques for efficiently deriving various edible proteins in relatively pure form from seeds of plants. It generally has been recognized by food scientists that the nature of the protein isolate obtainable will vary greatly from one crop to another and that the recovery of the desired protein product often is complex and not readily amenable to implementation on a commercially practicable basis. For instance, it heretofore has been found to be extremely difficult to develope routes to readily remove and to isolate the desired naturally occurring protein in ample yields, while not otherwise harming the same, to provide a product which possesses satisfactory physical and taste characteristics that are compatible with the intended end use.

For a general discussion of the complex nature of proteins encountered in seeds of Pisum sativum see (1) "In Vitro Hydrolysis of Skim Milk and Pea Proteins by Pepsin and Rennin" by R. S. Bhatty, Can. Inst. Food Sci. Technol., J., Vol. 15, No. 2, pages 101 to 108 (1982) and (2) "Electrophoretograms of Peas and Skim Milk Proteins Hydrolyzed in Vitro with Pepsin and Rennin" by R. S. Bhatty and P. R. Patel, J. Agric. Food Chem., Vol. 31, pages 297 to 300 (1983).

It is an object of the present invention to provide an improved process for producing a protein isolate derived from the seeds of a grain legume of relatively low lipid content.

It is an object of the present invention to provide an improved process for producing a quality protein isolate derived from the seeds of a grain legume of relatively low lipid content which is capable of being readily implemented on a commercial scale.

It is an object of the present invention to provide an improved protein isolate derived from seeds of a grain legume of relatively low lipid content which is satisfactory for human consumption and which exhibits satisfactory taste qualities.

It is an object of the present invention to provide in a preferred embodiment an improved process for producing a protein isolate derived from the seeds of Pisum sativum.

It is an object of the present invention to provide in a preferred embodiment an improved process for producing a quality protein isolate derived from seeds of Pisum sativum which is capable of being readily implemented on a commercial scale.

It is an object of the present invention to provide in a preferred embodiment an improved protein isolate derived from seeds of Pisum sativum which is satisfactory for human consumption and which exhibits satisfactory taste qualities.

It is another object of the present invention to provide in a preferred embodiment an improved protein isolate derived from seeds of Pisum sativum which exhibits excellent emulsifying properties and which is well suited for use as an additive for food systems.

These and other objects and advantages of the claimed invention will be apparent to those skilled in the art from the following detailed description and appended claims.

SUMMARY OF THE INVENTION

It has been found that a process for forming an improved protein isolate comprises:
(a) wet-milling seeds of a grain legume of relatively low lipid content in an aqueous medium to produce a finely milled slurry,
(b) adjusling the pH of the slurry to approximately 6.6 to 9.5 in order to promote the solubility of protein derived from the seeds in water and to form an extract of protein in water which inherently includes low molecular weight coagulation inhibitors derived from the seeds,
(c) substantially removing solid material present in the slurry from the extract of protein in water which inherently includes low molecular weight coagulation inhibitors derived from the seeds,
(d) ultrafiltering with the aid of diafiltration the extract of protein in water to substantially remove the low molecular weight coagulation inhibitors present therein to form a protein retentate, and
(e) coagulating the resulting protein retentate while at a pH of approximately 6.6 to 7.0 by the action of proteolytic enzyme to form an improved protein isolate.

It has been found that a process for forming an improved protein isolate comprises:
(a) wet-milling seeds of Pisum sativum in an aqueous medium to produce a finely milled slurry,
(b) adjusting the pH of said slurry to approximately 6.6 to 9.5 in order to promote the solubility of pea protein derived from the seeds in water and to form an extract of pea protein in water which inherently includes low molecular weight coagulation inhibitors derived from the seeds,
(c) substantially removing solid material present in the pea slurry from the extract of pea protein in water which inherently includes low molecular weight coagulation inhibitors derived from the seeds,
(d) pasteurizing the resulting extract of pea protein in water which inherently includes low molecular weight coagulation inhibitors derived from the seeds,
(e) ultrafiltering with the aid of diafiltration the resulting extract of pea protein in water to substantially remove low molecular weight coagulation inhibitors present therein to form a pea protein retentate,
(f) coagulating the resulting pea protein retentate while at a pH of approximately 6.6 to 7.0 by the action of proteolytic enzyme to form an improved protein isolate, and
(g) transforming the improved protein isolate into a solid particulate form.

The improved protein isolate of the present invention exhibits excellent emulsifying properties and can be used to advantage as an additive in meat products, such as sausages, etc.

BACKGROUND OF THE INVENTION

The starting material for use in the present invention is seeds of a grain legume of relatively low lipid content. In such plants energy tends to be stored in the form of starch rather than in lipids. Seeds from legumes of a relatively high lipid content which commonly are grown for their oil content should be avoided in view of the tendency for the lipids to interfere with the ultrafiltration step of the process (described hereafter) if present in a substantial concentration. In a preferred embodiment the seeds of the grain legume which serve as the starting material when hulled possess a lipid content of no more than approximately 2 percent by weight on a dry basis.

Representative grain legumes for use in the process of the present invention are *Cajanus cajan* (e.g., pigeon pea, Congo bean, red gram), *Cicer arietinum* (e.g., chickpea, Bengal gram), *Lens culinari* (e.g., lentil), *Phaseolus vulgarus* (e.g., common bean, haricot bean, kidney bean), *Pisum sativum* (e.g., peas, field peas including the sub-specie Avense), *Vica faba* (e.g., Faba bean), *Vigna mungo* (e.g., black gram), *Vigna radiata* (e.g., mung bean, green gram), and *Vigna unguiculata* (e.g., cowpea).

The particularly preferred starting material for use in the present invention is seeds of *Pisum sativum* plants. Such plants are grown in temperate zones of the world with the seeds being formed in elongated pods. The seeds of these plants have been found to contain a highly attractive protein component which may be isolated in a relatively pure form as described herein. Particularly good results have been achieved with those varieties of *Pisum sativum* which are commonly known as field peas and which are an important argronomic crop in many parts of the world. Green peas commonly consumed by humans also may be selected.

In accordance with the process of the present invention the seeds of relatively low lipid content are wet-milled in an aqueous medium to form a finely milled slurry. It is preferred that the hulls be removed from the seeds prior to such wet-milling by any appropriate technique (e.g., by threshing). However, the hulls optionally may be retained except in those instances in which the hulls inherently contain components which adversely influence the final product. The wet-milling conveniently can be carried out in conventional equipment commonly employed for such purpose in the presence of an abundant quantity of water. For instance, in preferred embodiments water is provided in the wet-milling equipment in a seeds-to-water weight ratio of approximately 0.2 to 0.4:1 (e.g., approximately 0.2 to 0.25:1). In a preferred embodiment the seeds are wet-milled in two steps wherein one initially forms a relatively coarse slurry, and subsequently forms the desired finely milled slurry. It has been found to be preferable to wet-mill the seeds to an extremely small particle size since this better facilitates the destruction of the plant cells in order to obtain dissolution of the desired protein in water and thereby enhances the product yield. In a particularly preferred embodiment of the present invention at the conclusion of the wet-milling at least 35 percent (e.g., at least 40 percent by weight) of the solid particles present in the resulting finely milled slurry are smaller than 30 microns in their longest dimension. Such particle size determination conveniently may be carried out by use of test sieve shakers of the EVS1 type available from the Endicott Company in accordance with the wet sifting technique. Representative equipment which is particularly suited for carrying out the required coarse wet-milling is a Model No. MK180 corundum stone mill with tooth discs manufactured by Fryma. Representative equipment which is particularly suited for carrying out the required fine wet-milling is a Model No. MK250 corundum stone mill manufactured by Fryma.

It has been found to be of considerable importance that the milling heretofore described be carried out under wet-milling conditions rather than under dry-milling conditions. Such wet-milling has been found to result in substantially less oxidation of the relatively small concentration of lipid components in the product, to minimize the thermal and mechanical destruction of starch particles and to thereby better facilitate their subsequent separation, and to avoid harm to the environment caused by dust particles.

The pH of the finely milled slurry is adjusted to near neutral or mildly alkaline conditions by the addition of a base in order to promote the solubility of protein derived from the seeds in water. The pH commonly is adjusted to approximately 6.6 to 9.5. In a preferred embodiment the pH is adjusted to approximately 6.8 to 7.0. Representative bases which conveniently can be selected to accomplish the pH adjustment include sodium hydroxide, potassium hydroxide, etc. The particularly preferred base for bringing about the pH adjustment is sodium hydroxide primarily because of economic considerations. In addition to protein, low molecular weight coagulation inhibitors derived from the seeds become dissolved in the water. These dissolved coagulation inhibitors have a molecular weight below approximately 20,000 since they are removed with the permeate in the ultrafiltration step (described hereafter).

Solid material present in the protein slurry next is substantially removed from the resulting extract of protein in water which inherently includes low molecular weight coagulation inhibitors derived from the seeds. Such separation may be accomplished through the use of conventional particle separation techniques. For instance, the separation may be accomplished by techniques such as centrifugation, sifting, filtering, decanting, hydro-cycloning, etc., and combinations of these techniques. In a preferred technique the slurry initially is sifted by use of a Jesma sieve having openings of 100 microns. The overflow mainly contains insoluble fiber material and the underflow mainly contains starch particles plus protein. The extract which may still contain very small solids may be subjected to centrifugation whereby starch particles substantially are separated as is other insoluble material present therein.

In a preferred embodiment the resulting extract of protein next is subjected to pasteurization in order to destroy microorganisms present therein.

Next the extract of protein in water is ultrafiltered with the aid of diafiltration whereby additional water is added to substantially remove the low molecular weight coagulation inhibitors present therein as a part of the permeate to form a protein retentate. As previously indicated, the low molecular weight coagulation inhibitors which are removed commonly have a molecular weight below approximately 20,000. Such treatment also removes low molecular weight components derived from the seeds which otherwise may, if not eliminated, impart an undesirable color and/or taste to the final product. Representative equipment which is particularly suited for carrying out the ultrafiltration with the aid of diafiltration are ultrafiltration module Nos. DDS-36 and DDS-37 manufactured by De Danske Sukkerfabrikker provided with GR60 polysulfone membranes. Particularly good results are achieved while using diafiltration conditions wherein the volume of water employed is approximately two times the volume of the feed. However, other water:feed ratios may be selected so long as the undesirable low molecular weight components are eliminated. In accordance with the concept of the present invention it is important that the low molecular weight coagulation inhibitors be removed so that they will not substantially impede the coagulation step (described hereafter).

In a particularly preferred embodiment the resulting protein retentate is next subjected to further pasteurization in order to destroy any microorganisms present therein.

The protein retentate following such ultrafiltration and possible pasteurization is subjected to the action of a least one proteolytic enzyme in order to bring about coagulation of the protein isolate. The proteolytic enzyme promotes the cleavage of peptide bonds present in the protein isolate and concomitantly brings about its coagulation. Representative proteolytic enzymes for use in the present invention include standard rennet, microbal rennet, rennin, chymosin, pepsin, papain, etc. The particularly preferred proteolytic enzyme for use in the present invention is standard rennet. Sufficient proteolytic enzyme is introduced to cause the substantially complete coagulation of the protein present in the protein retentate. In a preferred embodiment the proteolytic enzyme is introduced in an enzyme to protein ratio of approximately 5 to 25:100,000 (v/v). It should be appreciated, however, that lesser enzyme concentrations require more prolonged times to accomplish coagulation and the resulting coagulum will be less firm. Larger enzyme concentrations can be used without commensurate advantage. Also, a more rapid coagulation will result at an elevated temperature (e.g., 45° C.) instead of at ambient temperature (e.g., 25° C.). The pH of the protein retentate is adjusted to approximately 6.6 to 7.0 (e.g., 6.6 to 6.8) during coagulation step. The optimum pH selected will be influenced by the specific proteolytic enzyme employed and may be readily determined by simple experimentation. Such pH adjustment during the coagulation step conveniently can be carried out by the use of dilute hydrochloric acid, etc. The retentate is preferably present in a concentration of at least approximately 15 percent dry matter by weight (e.g., approximately 15 to 25 percent by weight) immediately prior to coagulation. The coagulum of protein typically has the consistency of a viscous gel-like mass.

Following the coagulation of the protein, the resulting protein isolate is collected as a wet coagulum or is recovered in a solid particulate form. Convenient techniques for the recovery of the product as solid particles are by use of (1) a vacuum evaporator, (2) a fluidized bed, (3) a spray drier (4) an agitated falling-film evaporator combined with a fluidized bed, etc. When spray drying is employed a particulate product commonly is formed having a particule size primarily in the range of approximately 40 to 100 microns.

The resulting protein isolate when in solid particulate form should preferably contain at least 83 percent protein by weight on a completely dry basis, and most preferably at least 90 percent protein by weight on a completely dry basis.

The improved protein isolate of the present invention is satisfactory for human consumption. In the particularly preferred embodiment the improved protein isolate derived from seeds of *Pisum sativum* possesses a mild pleasant taste and can be used to advantage as an additive for food systems. When resuspended the pea protein isolate exhibits excellent emusifying properties (i.e., binding properties) and is well compatible in meat products, such as sausages, saveloy, luncheon meats, etc. Other products to which the improved pea protein isolate of the present invention can be added include cod roe, bread, biscuits, microbiological substrates, ice cream, soft drinks, etc.

The resulting product is substantially free of undesirable alpha-galactosides, phytic acid, and trypsin inhibitor.

The following detailed example is presented as a specific illustration of the presently claimed invention. It should be understood, however, that the invention is not limited to the specific details set forth in the example.

EXAMPLE

Fully mature yellow field peas (*Pisum sativum*) of the Bodil variety are harvested and are dehulled by threshing. During the course of the threshing the peas also are split. Such split peas have a lipid content of less than 2 percent by weight.

The dehulled split peas are fed at the rate of 200 kg per hour to a Model No. MK180 corundum stone mill with tooth discs manufactured by Fryma together with 800 kg per hour of water which is provided at a temperature of approximately 12° to 20° C. While present in such corundum stone mill, coarse milling is carried out. The resulting pea slurry which passes out of the toothed colloid mill has a particle size of approximately 300 microns. The pea slurry next passes to a 500 liter first extraction tank where it is retained for approximately one-half hour.

The pea slurry while at a temperature of approximately 15° C. next is fed to a Model No. MK250 corundum stone mill manufactured by Fryma wherein fine-milling is carried out. At the conclusion of the fine-milling approximately 40 percent by weight of the undissolved particles present therein are smaller than 30 microns in the longest dimension.

The finely milled pea slurry next passes to a 500 liter second extraction tank. A 2 N. aqueous solution of sodium hydroxide is added to the contents of the second extraction tank with stirring until the pH of the slurry is raised to 6.8. The finely milled pea slurry is maintained in the second extraction tank with stirring for approximately 30 minutes while at a temperature of approximately 18° C. to produce an extract of pea protein in water. Such extract of pea protein also includes coagulation inhibitors which were derived from the peas having a molecular weight well below 20,000.

The contents of the second extraction tank next are passed to a Jesma sieve provided with a plurality of screens having mesh openings of 100 microns each. Such sieve collects the bulk of the solid fiber particles and allows very small solid particulate matter, the extract of pea protein, starch particles derived from the seeds, and low molecular weight coagulation inhibitors to pass. Solid fibers and particles which are collected on the sieve screens are removed for other uses. The fraction of the slurry which passes through the sieve next is processed in a Model No. CA655-011 centrifuge of the decanter type manufactured by Westfalia Separator. Such centrifuge serves to remove additional solid particles and suspended starch particles. The remaining fraction at this stage of the process consists primarily of water and approximately 10 percent by weight of other substances. Such other substances comprise approximately 62 percent by weight of dissolved pea protein, approximately 7.5 percent by weight ash, approximately 2.5 percent by weight of starch which was not previously removed, approximately 5.5 percent by weight of fat (i.e., lipids) derived from the peas and present in a more concentrated form, and approximately 22.5 percent by weight of soluble carbohydrates (e.g., sucrose, and alpha-galactosides such as verbascose, stacchiose, and raffinose).

Such remaining fraction next is pasteurized in a Pasilac Therm Model plate heat exchanger where it is heat-treated at 72° C. for 16 seconds, and subsequently is cooled to 50° C. to destroy microorganisms present therein. Next, this fraction, while at 50° C. is ultrafiltered with the aid of diafiltration. Ultrafiltration module Model Nos. DDS-36 and DDS-37 manufactured by De Danske Sukkerfabrikker provided with GR60 polysulfone membranes are employed at a pressure of 3 bar. The volume of water employed in the diafiltration step is approximately two times the volume of the feed and the solution is concentrated to a concentration of approximately 18 percent dry matter, and carbohydrates, ash and low molecular weight coagulation inhibitors derived from the seeds substantially are removed with the permeate.

The resulting pea protein retentate is collected and has a nitrogen content of approximately 2.6 percent by weight. Such retentate is again pasteurized in a Pasilac Therm Model plate heat exchanger where it is heat-treated at 72° C. for 16 seconds and is cooled to 37° C. to destroy microorganisms present therein.

The pea protein retentate next is transferred as a batch to an inoculation tank of the type used in cheese manufacture. The pH is adjusted to 6.8 through the addition of dilute hydrochloric acid. The resulting pea protein retentate continues to be present in a concentration of approximately 20 percent by weight. Chr. Hansen standard rennet is added in an enzyme to protein ratio of 15:100,000 (v/v). While at a temperature of 37° C., the contents are agitated for 1½ minutes to mix well and are held without further agitation for 30 minutes. Coagulation occurs to form a viscous gel-like mass over this period.

Next the pea protein isolate are recovered in a solid particulate form from the coagulum while using a scraped surface vacuum evaporator followed by a fluidized bed drier.

The resulting particulate pea protein isolate has a particle size primarily in the range of approximately 40 to 100 microns, a pale yellow coloration, an extremely faint aroma of peas, and a mild neutral taste. The product contains approximately 87 percent by weight protein, approximately 6 percent by weight lipids (i.e., fat), approximately 1 percent by weight carbohydrates, approximately 2 percent by weight ash, and approximately 4 percent by weight water. On a completely dry solids basis the product consists of approximately 90 percent by weight protein.

The product is particularly well suited for use as an additive in meat products. For instance, the product performs well as an additive in sausages and saveloy at a concentration of 3 percent by weight.

Although the invention has been described with a preferred embodiment, it is to be understood that variations and modifications may be resorted to as will be apparent to those skilled in the art. Such variations and modifications are to be considered within the purview and scope of the claims appended hereto.

We claim:

1. A process for forming an improved protein isolate comprising;
   (a) wet-milling seeds of a grain legume of relatively low lipid content in an aqueous medium to produce a finely milled slurry,
   (b) adjusting the pH of said slurry to approximately 6.6 to 9.5 in order to promote the solubility of protein derived from said seeds in water and to form an extract of protein in water which inherently includes low molecular weight coagulation inhibitors derived from said seeds,
   (c) substantially removing solid material present in said slurry from said extract of protein in water which inherently includes low molecular weight coagulation inhibitors derived from said seeds,
   (d) ultrafiltering with the aid of diafiltration said extract of protein in water to substantially remove said low molecular weight coagulation inhibitors present therein to form a protein retentate, and
   (e) coagulating said resulting protein retentate while at a pH of approximately 6.6 to 7.0 by the action of proteolytic enzyme to form an improved protein isolate.

2. A process for forming an improved protein isolate according to claim 1 wherein the seeds of said grain legume which are wet-milled in step (a) possess a lipid content of no more than approximately 2 percent by weight on a dry basis.

3. A process for forming an improved protein isolate according to claim 1 wherein the seeds of said grain legume which are wet-milled in step (a) are obtained from plants selected from the group consisting of *Cajanus cajan, Cicer arietinum, Lens culinari, Phaseolus vulgaris, Pisum sativum, Vica faba, Vigna mungo, Vigna radiata, Vigna unguiculata,* and mixtures of two or more of the foregoing.

4. A process for forming an improved protein isolate according to claim 1 wherein the seeds of said grain legume which are wet-milled in step (a) are obtained from *Pisum sativum* plants.

5. A process for forming an improved protein isolate according to claim 1 wherein the seeds of said grain legume which are wet-milled in step (a) are obtained from *Vicia faba* plants.

6. A process for forming an improved protein isolate according to claim 1 wherein said wet-milling of step (a) is carried out while said seeds are in a dehulled state.

7. A process for forming an improved protein isolate according to claim 1 wherein said wet-milling of step (a) is carried out at a seeds-to-water weight ratio of approximately 0.1 to 0.4:1.

8. A process for forming an improved protein isolate according to claim 1 wherein said wet-milling of step (a) is carried out at a seeds-to-water weight ratio of approximately 0.2 to 0.25:1.

9. A process for forming an improved protein isolate according to claim 1 wherein at the conclusion of said wet-milling of step (a) at least 35 percent by weight of the undissolved solid particles present in the resulting finely milled slurry are smaller than 30 microns in the longest dimension.

10. A process for forming an improved protein isolate according to claim 1 wherein in step (b) the pH of said slurry is adjusted to approximately 6.8 to 7.0.

11. A process for forming an improved protein isolate according to claim 1 wherein in step (b) the pH of said slurry is adjusted with sodium hydroxide.

12. A process for forming an improved protein isolate according to claim 1 wherein in step (c) solid material present in said slurry is removed by a technique selected from the group consisting of centrifugation, sifting, filtering, decanting, hydro-cyloning, and combinations of two or more of the foregoing.

13. A process for forming an improved protein isolate according to claim 1 wherein during the course of step (c) starch particles derived from said seeds are substantially removed from said extract of protein by centrifugation.

14. A process for forming an improved protein isolate according to claim 1 wherein said extract of protein immediately following step (c) is subjected to pasteurization.

15. A process for forming an improved protein isolate according to claim 1 wherein said ultrafiltration with the aid of diafiltration of step (d) serves to substantially remove dissolved permeate molecules having a molecular weight below approximately 20,000 which includes said low molecular weight coagulation inhibitors.

16. A process for forming an improved protein isolate according to claim 1 wherein said protein retentate immediately following step (d) is subjected to pasteurization.

17. A process for forming an improved protein isolate according to claim 1 wherein said protein retentate is present in a concentration of at least approximately 15 percent by weight immediately prior to said coagulation of step (e).

18. A process for forming an improved protein isolate according to claim 1 wherein said protein retentate is coagulated in step (e) by the action of proteolytic enzyme while at a pH of approximately 6.6 to 6.8.

19. A process for forming an improved protein isolate according to claim 1 wherein during step (e) said pH is adjusted by the use of dilute hydrochloric acid.

20. A process for forming an improved protein isolate according to claim 1 wherein said proteolytic enzyme employed in step (e) is standard rennet.

21. A process for forming an improved protein isolate according to claim 1 wherein said proteolytic enzyme is employed in step (e) in an enzyme to protein ratio of approximately 5 to 25:100,000 (v/v).

22. A process for forming an improved protein isolate according to claim 1 which includes the additional step (f) of transforming said improved protein isolate into solid particulate form.

23. A process for forming an improved protein isolate according to claim 22 wherein during step (f) said improved protein isolate is transformed into solid particulate form by spray drying.

24. A process for forming an improved protein isolate according to claim 22 wherein during step (f) said improved protein isolate is transformed into solid particulate form while present in a fluidized bed.

25. A process for forming an improved protein isolate comprising:
(a) wet-milling seeds of *Pisum sativum* in an aqueous medium to produce a finely milled slurry,
(b) adjusting the pH of said slurry to approximately 6.6 to 9.5 in order to promote the solubility of pea protein derived from said seeds in water and to form an extract of pea protein in water which inherently includes low molecular weight coagulation inhibitors derived from said seeds,
(c) substantially removing solid material present in said pea slurry from said extract of pea protein in water which inherently includes low molecular weight coagulation inhibitors derived from said seeds,
(d) pasteurizing said resulting extract of pea protein in water which inherently includes low molecular weight coagulation inhibitors derived from said seeds,
(e) ultrafiltering with the aid of diafiltration said resulting extract of pea protein in water to substantially remove low molecular weight coagulation inhibitors present therein to form a pea protein retentate,
(f) coagulating said resulting pea protein retentate while at a pH of approximately 6.6 to 7.0 by the action of proteolytic enzyme to form an improved protein isolate, and
(g) transforming said improved protein isolate into a solid particulate form.

26. A process for forming an improved protein isolate according to claim 25 wherein said wet-milling of step (a) is carried out while said seeds of *Pisum sativum* are in a dehulled state.

27. A process for forming an improved protein isolate according to claim 25 wherein said wet-milling of step (a) is carried out at a seeds-to-water weight ratio of approximately 0.1 to 0.4:1.

28. A process for forming an improved protein isolate according to claim 25 wherein said wet-milling of step (a) is carried out at a seeds-to-water weight ratio of approximately 0.2 to 0.25:1.

29. A process for forming an improved protein isolate according to claim 25 wherein at the conclusion of said wet-milling at least 35 percent by weight of the undissolved solid particles present in the resulting finely milled pea slurry are smaller than 30 microns in the longest dimension.

30. A process for forming an improved protein isolate according to claim 25 wherein in step (b) the pH of said pea slurry is adjusted to approximately 6.8 to 7.0.

31. A process for forming an improved protein isolate according to claim 25 wherein in step (b) the pH of said pea slurry is adjusted with sodium hydroxide.

32. A process for forming an improved protein isolate according to claim 25 wherein in step (c) solid material present in said pea slurry is removed by a technique selected from the group consisting of centrifugation, sifting, filtering, decanting, hydro-cycloning, and combinations of two or more of the foregoing.

33. A process for forming an improved protein isolate according to claim 25 wherein during the course of step (c) starch particles derived from said seeds are substantially removed from said extract of pea protein by centrifugation.

34. A process for forming an improved protein isolate according to claim 25 wherein said diafiltration of step (e) serves to substantially remove dissolved permeate molecules having a molecular weight below approximately 20,000 which includes said low molecular weight coagulation inhibitors.

35. A process for forming an improved protein isolate according to claim 25 wherein said pea protein retentate additionally is subjected to pasteurization immediately prior to said coagulation step (f).

36. A process for forming an improved protein isolate according to claim 25 wherein said pea protein retentate is present in a concentration at least approximately 15 percent by weight immediately prior to said coagulation of step (f).

37. A process for forming an improved protein isolate according to claim 25 wherein said pea protein retentate is coagulated in step (f) by the action of a proteolytic enzyme while at a pH of approximately 6.6 to 6.8.

38. A process for forming an improved protein isolate according to claim 25 wherein during step (f) said pH is adjusted by the use of dilute hydrochloric acid.

39. A process for forming an improved protein isolate according to claim 25 wherein said proteolytic enzyme employed in step (f) is standard rennet.

40. A process for forming an improved protein isolate according to claim 25 wherein said proteolytic enzyme is employed in step (f) in an enzyme to protein ratio of approximately 5 to 25:100,000 (v/v).

41. A process for forming an improved protein isolate according to claim 25 wherein during step (g) said improved protein isolate is transformed into a solid particulate form by spray drying.

42. A process for forming an improved protein isolate according to claim 25 wherein during step (g) said improved protein isolate is transformed into a solid particulate form while present in a fluidized bed.

* * * * *